(12) United States Patent
Torrey et al.

(10) Patent No.: US 10,288,074 B2
(45) Date of Patent: May 14, 2019

(54) CONTROL SUB-SYSTEM AND RELATED METHOD OF CONTROLLING ELECTRIC MACHINE IN FLUID EXTRACTION SYSTEM

(71) Applicant: General Electric Company, Schenectady, NY (US)

(72) Inventors: David Allan Torrey, Ballston Spa, NY (US); Nathaniel Benedict Hawes, Jr., Milton, NY (US); Ayman Mohamed Fawzi El-Refaie, Niskayuna, NY (US); Muhammad Hassan Chishti, Highlands Ranch, CO (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 111 days.

(21) Appl. No.: 14/939,221

(22) Filed: Nov. 12, 2015

(65) Prior Publication Data
US 2017/0077847 A1 Mar. 16, 2017

Related U.S. Application Data

(60) Provisional application No. 62/218,613, filed on Sep. 15, 2015.

(51) Int. Cl.
*H02P 6/14* (2016.01)
*F04D 13/08* (2006.01)
(Continued)

(52) U.S. Cl.
CPC ......... *F04D 13/08* (2013.01); *B01D 17/0217* (2013.01); *B01D 19/0057* (2013.01);
(Continued)

(58) Field of Classification Search
CPC ... H02P 6/14; G05F 1/00; G05F 1/455; G05F 5/02; F04B 23/00; E21B 43/00; H02M 1/084
See application file for complete search history.

(56) References Cited

U.S. PATENT DOCUMENTS

| 2,938,090 A | 5/1960 | Weber |
| 2,997,609 A | 8/1961 | Lung |

(Continued)

FOREIGN PATENT DOCUMENTS

| CA | 2619583 A1 | 12/2004 |
| CN | 2160777 Y | 4/1994 |

OTHER PUBLICATIONS

Liang et al., "Generators operating with variable frequency drives in an offshore facility", Electrical and Computer Engineering (CCECE), 2010 23rd Canadian Conference on, pp. 1-7, May 2-5, 2010.
(Continued)

*Primary Examiner* — Bickey Dhakal
*Assistant Examiner* — Said Bouziane
(74) *Attorney, Agent, or Firm* — GE Global Patent Operation

(57) ABSTRACT

A control sub-system for controlling an electric machine is presented. The control sub-system includes a phase shift control unit to receive an electric signal indicative of an angular position of a rotor. The phase shift control unit generates a phase shifted electric signal by applying a phase shift to the electric signal. The magnitude of the phase shift is determined based on a speed control signal. The phase shift control unit is configured to generate a phase command signal based on the phase shifted electric signal. The control sub-system also includes a switching unit to control a supply of a phase current to one or more phase windings the electric machine based on the phase command signal such that the
(Continued)

rotor is operated at a predetermined rotational speed. Related method of controlling the electric machine is also presented.

16 Claims, 9 Drawing Sheets

(51) Int. Cl.
| | | |
|---|---|---|
| *B01D 19/00* | (2006.01) | |
| *B01D 21/26* | (2006.01) | |
| *B01D 17/02* | (2006.01) | |
| *B01D 45/12* | (2006.01) | |
| *E21B 43/12* | (2006.01) | |
| *F04D 13/10* | (2006.01) | |
| *H02P 6/15* | (2016.01) | |
| *H02P 5/74* | (2006.01) | |
| *H02P 6/16* | (2016.01) | |

(52) U.S. Cl.
CPC ........... *B01D 21/267* (2013.01); *B01D 45/12* (2013.01); *E21B 43/128* (2013.01); *F04D 13/10* (2013.01); *H02P 5/74* (2013.01); *H02P 6/15* (2016.02); *H02P 6/16* (2013.01); *H02P 2201/03* (2013.01)

(56) References Cited

U.S. PATENT DOCUMENTS

| | | | |
|---|---|---|---|
| 3,638,732 A | 2/1972 | Huntsinger et al. | |
| 4,277,735 A * | 7/1981 | Okuyama | 318/766 |
| 4,581,613 A | 4/1986 | Ward et al. | |
| 4,651,068 A * | 3/1987 | Meshkat-Razavi | H02P 6/06 |
| | | | 318/400.02 |
| 5,282,263 A | 1/1994 | Nenniger | |
| 6,045,333 A | 4/2000 | Breit | |
| 6,167,965 B1 | 1/2001 | Bearden et al. | |
| 7,202,619 B1 | 4/2007 | Fisher | |
| 7,314,084 B2 | 1/2008 | Rodrigues et al. | |
| 7,859,152 B2 | 12/2010 | Orban | |
| 7,931,090 B2 | 4/2011 | Smedstad et al. | |
| 7,971,650 B2 | 7/2011 | Yuratich et al. | |
| 8,353,336 B2 | 1/2013 | Neuhaus et al. | |
| 8,353,352 B2 | 1/2013 | Leitch | |
| 8,633,623 B2 | 1/2014 | Bingler | |
| 8,672,641 B2 | 3/2014 | Yuratich | |
| 8,770,271 B2 | 7/2014 | Fielder et al. | |
| 8,833,441 B2 | 9/2014 | Fielder et al. | |
| 8,851,165 B2 | 10/2014 | Fielder et al. | |
| 2006/0066273 A1 * | 3/2006 | Matsuhashi | H02P 6/10 |
| | | | 318/400.02 |
| 2008/0286134 A1 | 11/2008 | Regalado et al. | |
| 2009/0108784 A1 * | 4/2009 | Sakamoto | H02P 6/182 |
| | | | 318/400.34 |
| 2010/0247335 A1 | 9/2010 | Atherton | |
| 2013/0043034 A1 | 2/2013 | Drablier et al. | |
| 2013/0113400 A1 * | 5/2013 | Kishimoto | H02P 6/16 |
| | | | 318/400.14 |
| 2013/0147410 A1 | 6/2013 | Head et al. | |
| 2013/0285586 A1 * | 10/2013 | Koda | H02P 6/18 |
| | | | 318/400.35 |
| 2015/0270799 A1 * | 9/2015 | Toliyat | H02P 25/22 |
| | | | 318/474 |
| 2015/0380938 A1 | 12/2015 | Elasser et al. | |
| 2016/0380560 A1 | 12/2016 | Torrey | |
| 2017/0099023 A1 * | 4/2017 | Attarian | H02P 23/0077 |

OTHER PUBLICATIONS

Torrey, D.A., et al., Power Delivery System and Method, GE Co-Pending U.S. Appl. No. 62/016,969, filed Jun. 25, 2014.

* cited by examiner

CONTROL SUB-SYSTEM AND RELATED METHOD OF CONTROLLING ELECTRIC MACHINE IN FLUID EXTRACTION SYSTEM

CROSS-REFERENCE TO RELATED APPLICATIONS

This application claims the priority and benefit of U.S. Provisional Application No. 62/218,613 entitled "FLUID EXTRACTION SYSTEM AND RELATED CONTROL SUB-SYSTEM" filed on Sep. 15, 2015, which is incorporated herein by reference in its entirety.

BACKGROUND

Embodiments of the present disclosure relate to a fluid extraction system, and more particularly to a fluid extraction system having a control sub-system configured to control a plurality of electric machines.

In oil and/or gas mining operations, an electric machine, such as an electric submersible pump (ESP), is prevalently used to extract production fluids such as oil and/or gas from a well. The ESP may be disposed in the well to remove the oil and/or gas. Conventionally, to control an operating parameter such as an operating speed of the ESP, a variable speed drive (VSD) fed by a fixed frequency alternating current (AC) supply is employed. The VSD synthesizes three-phase AC voltages and currents of such frequency as is necessary to excite the ESP such that the ESP operates in the desired manner.

More particularly, the VSD and a source of the AC supply and are typically disposed on a surface (e.g., outside the well) and the three-phase AC power is delivered into the well to the ESP through a long cable that extends from the surface to a location inside the well where the ESP is deployed. The supply of the AC power into the well is typically very costly as more conductors are needed to supply the three-phase AC power in comparison to the conductors required for the supply of the DC power.

For increased well productivity, it is desirable to have multiple electric submersible pumps within the same well, each operable at its own speed. Accordingly, a well may be formed to have one or more vertical sections and horizontal sections. One or more ESPs may be employed in each of the vertical sections and horizontal sections. Accordingly, if the abovementioned conventional approach is used, an individual VSD may be required for each ESP of the one or more ESPs. Moreover, a separate power cable (containing at least three conductors for three phase AC power) is required to supply the AC three-phase power to each ESP. Accordingly, use of such conventional approach is not cost effective.

In another conventional approach, a common VSD is employed to control operation of the multiple ESPs. However, in such configuration, all the ESPs need to operate at the same operating speed. This is unlikely to optimize the well productivity.

In yet another conventional approach, a single VSD is employed on the surface that supplies AC power to a first ESP in the well, with subsequent ESPs being supplied by controllers that are in the well. These controllers need to function as cyclo-converters that receive an AC of one frequency and amplitude into another AC of another frequency and amplitude for excitation of each additional ESP in the well. However, use of such electronic controllers may not be reliable in the harsh environment within the well. In addition, control of the operating speed of an ESP independent of the operation of other ESPs in the well, is another challenge.

BRIEF DESCRIPTION

In accordance with aspects of the present specification, a control sub-system for controlling an electric machine is presented. The control sub-system includes a phase shift control unit configured to receive an electric signal indicative of an angular position of a rotor of the electric machine from at least one rotor position sensor of the electric machine. The phase shift control unit is further configured to generate a phase shifted electric signal by applying a phase shift to the electric signal, where a magnitude of the phase shift is determined based at least on a speed control signal indicative of a predetermined rotational speed of the rotor. Furthermore, the phase shift control unit is configured to generate a phase command signal based on the phase shifted electric signal. The control sub-system also includes a switching unit electrically coupled to the phase shift control unit and configured to control a supply of a phase current to one or more phase windings of a plurality of phase windings of the electric machine based on the phase command signal such that the rotor is operated at the predetermined rotational speed.

In accordance with yet another aspect of the present specification, a method for controlling an electric machine is presented. The method includes receiving an electric signal indicative of an angular position of a rotor of the electric machine from at least one rotor position sensor. The method further includes generating a phase shifted electric signal by applying a phase shift to the electric signal, where a magnitude of the phase shift is determined based at least on a speed control signal indicative of a predetermined rotational speed of the rotor. Furthermore, the method includes generating a phase command signal based on the phase shifted electric signal. The method also includes selectively supplying a phase current to one or more of the plurality of phase windings based on the phase command signal such that the rotor is operated at the predetermined rotational speed.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

Figure 1:
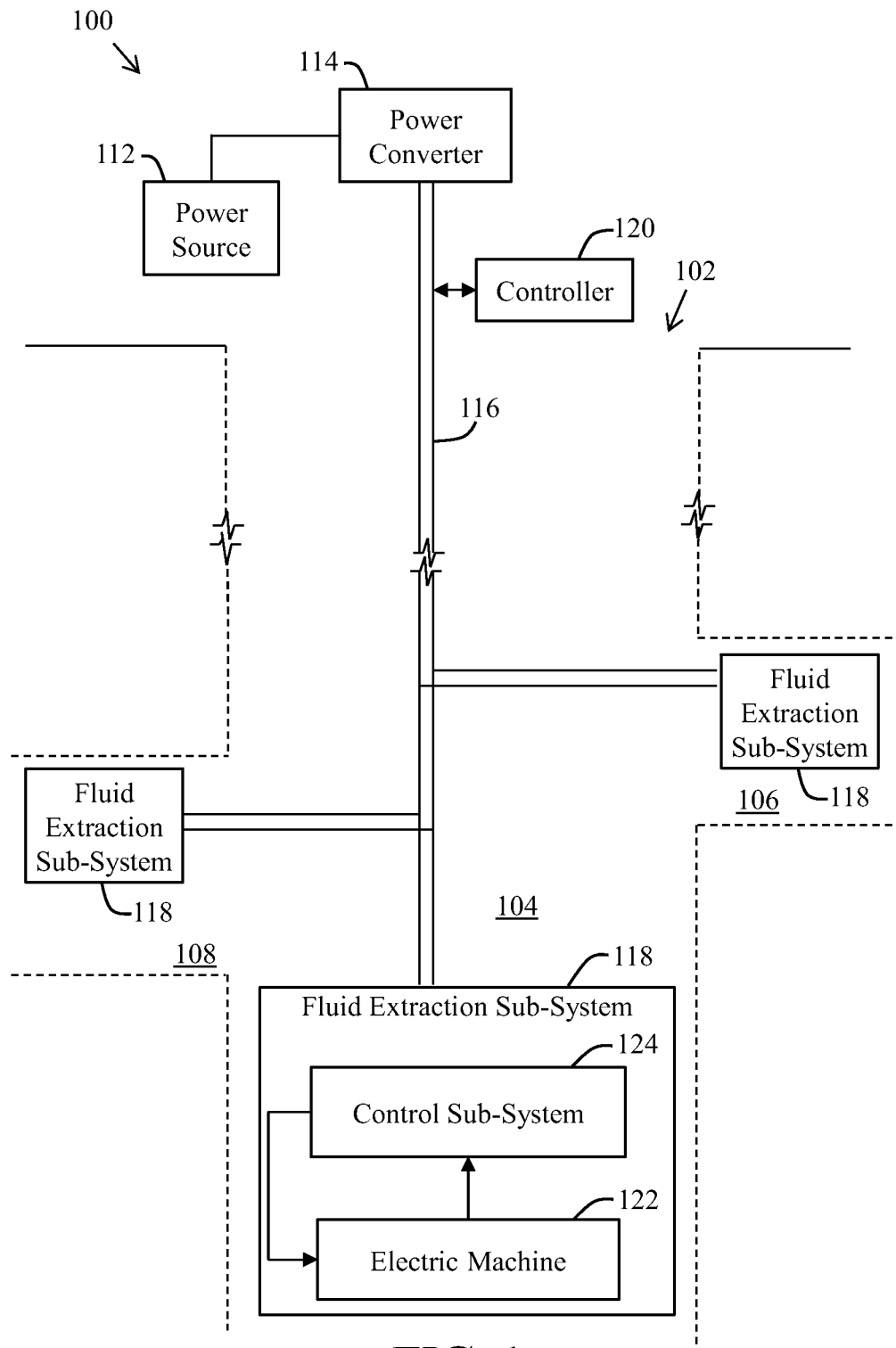
FIG. 1 is a diagrammatical illustration of a fluid extraction system, in accordance with aspects of the present specification.

The specification may be best understood with reference to the detailed figures and description set forth herein. Various embodiments are described hereinafter with reference to the figures. However, those skilled in the art will readily appreciate that the detailed description given herein with respect to these figures is for explanatory purposes as the method and the system may extend beyond the described embodiments.

In the following specification, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

In accordance with some aspects of the present specification, a fluid extraction system is presented. The fluid extraction system includes a direct current (DC) bus and a plurality of fluid extraction sub-systems disposed in a well and electrically coupled to the DC-bus. At least one fluid extraction sub-system of the plurality of fluid extraction sub-systems includes an electric machine configured to aid in the extraction of a fluid from a well, where the electric machine includes at least a plurality of phase windings and a rotor. The at least one fluid extraction sub-system further includes a control sub-system electrically coupled to the electric machine and configured to control a rotational speed of the rotor by selectively controlling a supply of a phase current from the DC-bus to one or more of the plurality of phase windings such that the rotational speed of the rotor of the electric machine is different from a rotational speed of a rotor of another electric machine in one or more/at least one other fluid extraction sub-systems of the plurality of fluid extraction sub-systems.

In some embodiments, the control sub-system includes a phase shift control unit configured to receive an electric signal indicative of an angular position of the rotor from the at least one rotor position sensor. The phase shift control unit is further configured to generate a phase shifted electric signal by applying a phase shift to the electric signal, where a magnitude of the phase shift is determined based at least on a speed control signal indicative of a predetermined rotational speed of the rotor. Furthermore, the phase shift control unit is also configured to generate a phase command signal based on the phase shifted electric signal. The control sub-system further includes a switching unit electrically coupled to the phase shift control unit and configured to control a supply of a phase current to one or more of the plurality of phase windings based on the phase command signal such that the rotor is operated at the predetermined rotational speed.

FIG. 1 is a diagrammatical illustration of a fluid extraction system 100, in accordance with aspects of the present specification. In one embodiment, the fluid extraction system 100 may be used to extract fluid from a well 102. Examples of the fluid may include, but are not limited to, water, natural gas, petroleum products such as oil, and the like. In some embodiments, depending on a resource of the fluid, the well 102 may be formed of one or more vertical sections such as a vertical section 104 and/or one or more horizontal sections such as a first horizontal section 106 and a second horizontal section 108. In some embodiments, the fluid extraction system 100 may include one or more of a power source 112, a power converter 114, a DC-bus 116, a plurality of fluid extraction sub-systems 118, and a controller 120.

The power source 112 may be representative of a power generation and/or distribution system operable to generate and/or distribute an alternating current (AC) or a direct current (DC). By way of example, the power source 112 may include an AC generation and/or distribution system, a high voltage DC (HVDC) generation and/or distribution system, a medium voltage DC (MVDC) generation and/or distribution system, a solar power plant, a wind based power plant, energy storage mediums such as batteries, and the like. The power convertor 114 may be an AC-DC converter or a DC-DC converter.

In some embodiments, the DC-bus 116 may be coupled between the power converter 114 and the plurality of fluid extraction sub-systems 118. The DC-bus 116 may facilitate power transmission from the power source 112 to the plurality of fluid extraction sub-systems 118. The DC-bus 116 may include two conductors—one conductor to supply a positive current and another conductor to supply a negative current, from the power converter 114 to the plurality of fluid extraction sub-systems 118. Advantageously, DC transmission to the fluid extraction sub-systems 118 in the well 102 results in reduction in overall cost of the fluid extraction system 100 in comparison to AC transmission to the fluid extraction sub-systems 118 in the well 102.

The fluid extraction sub-systems 118 are coupled to the DC-bus 116 and may aid in extracting the fluid from respective sections of the well 102. For example, as depicted in FIG. 1, one fluid extraction sub-system 118 is disposed in one or more of the vertical section 104, the first horizontal section 106, and the second horizontal section 108. Depending on a requirement, fewer or greater number of fluid extraction sub-systems 118 may be employed. For simplicity of illustration, only the fluid extraction sub-system 118 disposed in the vertical section 104 is shown and described in greater details.

Figure 3:
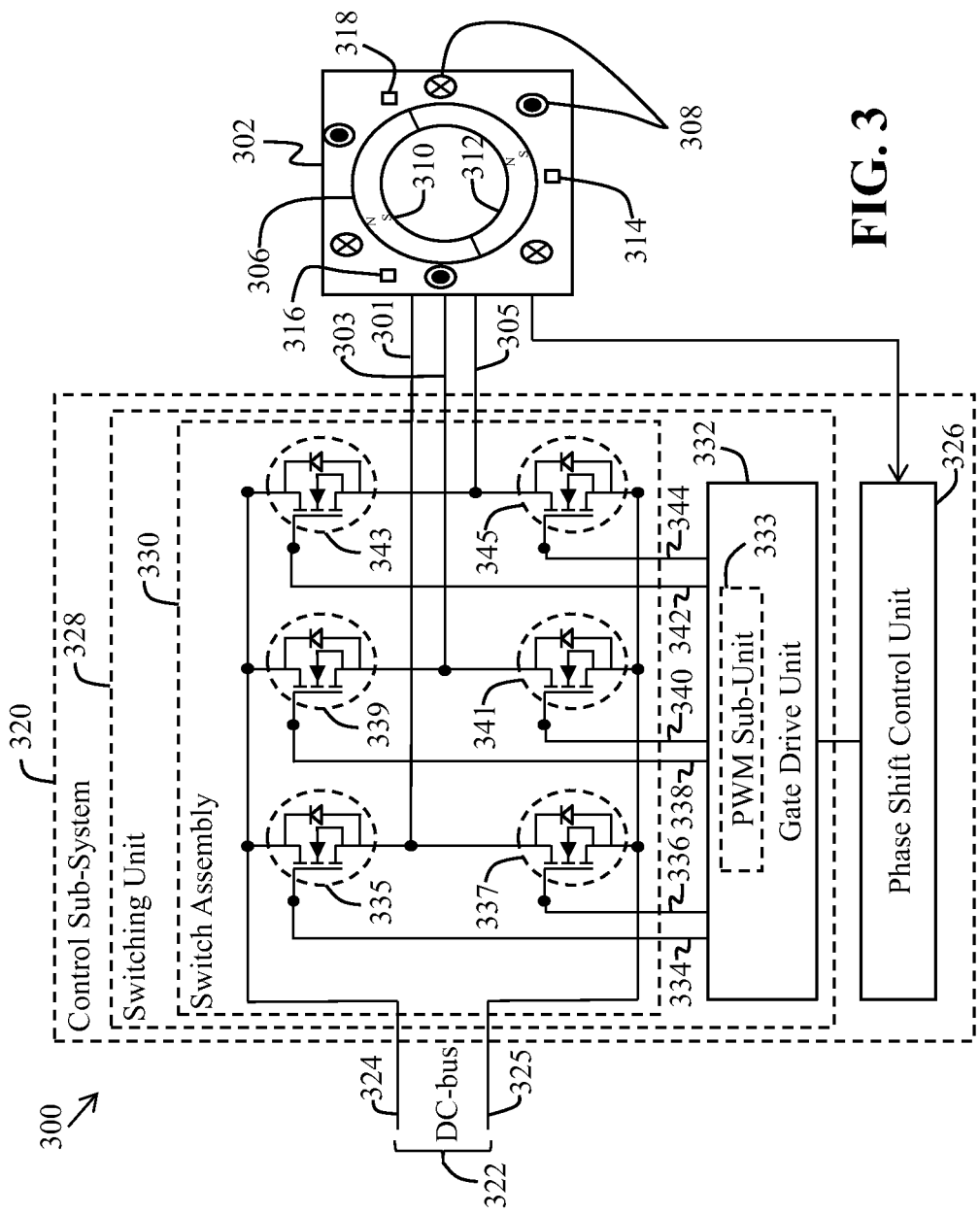
FIG. 3 is a diagrammatical illustration of a fluid extraction sub-system, in accordance with aspects of the present specification.

The fluid extraction sub-system 118 may include an electric machine 122. In one embodiment, the electric machine 122 may be an electric motor, for example, a permanent magnet (PM) motor. In some embodiments, the electric machine 122 (for example, the electric motor) may be integrated into an electric submersible pump (ESP) (not shown in FIG. 1), where the electric motor may drive an impeller(s) of the ESP. In some embodiments, the electric machine 122 may include a rotor and a stator having a plurality of phase windings (as shown in FIG. 3). Further details of the electric machine 122 are described in conjunction with FIG. 3.

The fluid extraction sub-system 118 may further include a control sub-system 124. The control sub-system 124 may be electrically coupled to the electric machine 122 and the DC-bus 116. The control sub-system 124 may be controlled by the controller 120. In some embodiments, the control sub-system 124 may be configured to selectively control a supply of a phase current to the electric machine 122 from the DC-bus 116. Accordingly, the control sub-system 124 may be configured to control a rotational speed (for example, revolutions per minute (rpm)) of the rotor of the electric machine 122 by selectively controlling the supply of the phase current to one or more of the plurality of phase windings. In some embodiments, the phase current to one or more of the plurality of phase windings may be controlled such that the rotational speed of the rotor of the electric machine 122 is different from a rotational speed of a rotor of another electric machine in one or more other fluid extraction sub-systems 118 of the plurality of fluid extraction sub-systems 118. In some embodiments, the control sub-system 124 may be configured to control the rotational speed of the rotor of the electric machine 122 independent of the operating speeds of rotors in other fluid extraction sub-systems 118. Further details of the control sub-system 124 are described in conjunction with FIG. 3. Hereinafter, the terms "rotational speed," "operating speed," "operating speed of electric machine" are interchangeably used and refer to rotational speed in rpm of a rotor of an electric machine, such as the electric machine 122.

The controller 120 may be disposed outside the well 102. The controller 120 may include a specially programmed general purpose computer, a microprocessor, a digital signal processor, and/or a microcontroller. The controller 120 may also include input/output ports and a storage medium, such as, an electronic memory. Various examples of the microprocessor include, but are not limited to, a reduced instruction set computing (RISC) architecture type microprocessor or a complex instruction set computing (CISC) architecture type microprocessor. Further, the microprocessor may be of a single-core type or multi-core type.

In some embodiments, the controller 120 may be configured to control operation of the power converter 114 and/or the fluid extraction sub-systems 118 in order to achieve desired flow rate and/or amount of the fluid from the well 102. To aid in such control of the power converter 114 and/or the fluid extraction sub-systems 118, in one embodiment, the controller 120 may be coupled to the power converter 114 and/or the fluid extraction sub-systems 118 via the DC-bus 116. In another embodiment, the controller 120 may be coupled to the power converter 114 and/or the fluid extraction sub-systems 118 using separate cables. In yet another embodiment, the controller 120 may be wirelessly coupled to the power converter 114 and/or the fluid extraction sub-systems 118.

In order to achieve desired flow rate and/or the amount of the fluid from the well 102, it may be desired to operate the electric machines of different fluid extraction sub-systems 118 at optimum operating speeds. Accordingly, it may be desirable to operate the electric machines of different fluid extraction sub-systems 118 at different operating speeds. In some embodiments, the operating speed of the electric machines used in the fluid extraction sub-systems 118 depends on a DC voltage on the DC-bus 116 (see FIG. 2).

Figure 2:
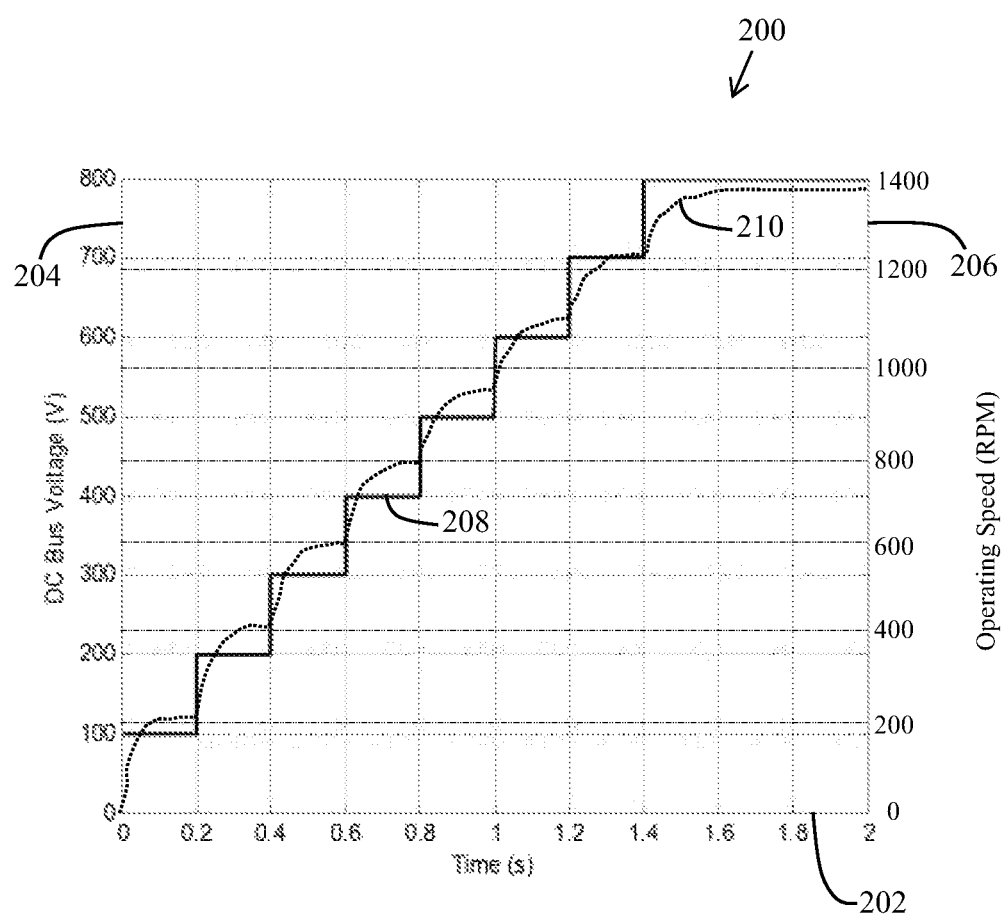
FIG. 2 is a graphical representation depicting an example relationship between a DC-bus voltage and an operating speed of an electric machine, in accordance with aspects of the present specification.

Turning now to FIG. 2, a graphical representation 200 of an example relationship between a DC-bus voltage and an operating speed of an electric machine is presented, in accordance with aspects of the present specification. The X-axis 202 of the graphical representation 200 represents time in seconds, for example. The first Y-axis 204 represents DC voltage magnitudes in volts ranging from 0 to 800, for example. Moreover, the second Y-axis 206 represents the operating speed of an electric machine, such as the electric machine 122, ranging from 0 to 1400 rpm, for example. In particular, a graph 208 represents the DC voltage magnitudes on the DC-bus 116 in steps of 100 volts and a graph 210 represents maximum values of the operating speed of the electric machine 122 corresponding to the magnitudes of DC voltage of the graph 208.

Referring again to FIG. 1, in some embodiments, the controller 120 may be configured with data representative of the graphical representation 200. For example, the data representative of the graphical representation 200 may be stored in the memory associated with the controller 120, for example, in the form of a look-up table or a mathematical relationship. Accordingly, depending on desired maximum operating speeds of the electric machines in the fluid extraction sub-systems 118, the controller 120 may be configured to control operation of the power converter 114 to adjust the magnitude of the DC voltage on the DC-bus 116. The controller 120 may determine the magnitude of DC voltage based on the data representative of the graphical representation 200.

In some embodiments, in the absence of the control performed by the control sub-system 124 (as previously noted), the maximum speed of the electric machines in the fluid extraction sub-systems 118 is defined by the magnitude of the DC voltage on the DC-bus 116 (see FIG. 2). However, as previously noted, it may be desirable to operate the electric machines of the fluid extraction sub-systems 118 at different operating speeds. Therefore, in certain embodiments, in order to further fine tune the operating speeds of the electric machines of the fluid extraction sub-systems 118, the controller 120 may be configured to communicate a speed control signal (described later in FIG. 3) to one or more of the fluid extraction sub-systems 118. The speed control signal may be indicative of desired operating speeds of one or more of the electric machines in the fluid extraction sub-systems 118. Such speed control signal may be received by the control sub-systems of the fluid extraction sub-systems 118. Accordingly, the control sub-systems may be configured to further control (for example, reduce) the operating speed of the respective electric machines based on the speed control signal. Consequently, the electric machines of the fluid extraction sub-systems 118 may be operated at different operating speeds.

FIG. 3 is a diagrammatical illustration of a fluid extraction sub-system 300, in accordance with aspects of the present specification. The fluid extraction sub-system 300 may be representative of one embodiment of the fluid extraction sub-system 118 of FIG. 1.

As previously noted, the fluid extraction sub-system 300 may include an electric machine such as an electric machine 302 that drives a pump. The electric machine 302 may include a stationary stator (not shown in FIG. 3). The stator may include a plurality phase windings such as phase windings 308. The phase windings 308 may be disposed on stator poles (not shown). In some embodiments, as depicted in FIG. 3, the phase windings 308 may include three sets of windings shown using an alternate pair of 'dot' and 'cross' symbols. By way of example, the 'cross' symbol may represent winding conductors for supplying a current directed into the plane of paper and the 'dot' may represent winding conductors supplying the current directed out of the plane the paper.

In some embodiments, the electric machine 302 may include three input conductors 301, 303, and 305, hereinafter referred to as phase input lines 301, 303, and 305. The phase input lines 301, 303, and 305 are coupled to the three sets of the phase windings 308, respectively. Phase current to each of the three set of phase windings 308 may be supplied via the phase input lines 301, 303, and 305.

Furthermore, the electric machine 302 may include a rotor 306 movable (for example, rotatable) with respect to the stator when the phase current is supplied to one or more of the phase windings 308. For ease of illustration, the rotor 306 is shown as having two rotor poles 310 and 312. Other embodiments of the rotor 306 having greater number of rotor poles is also contemplated. In one embodiment, the rotor poles 310 and 312 may be formed of permanent magnets. By way of example, the rotor poles 310 and 312 may be disposed such that N-side of the rotor pole 310 and S-side of the rotor pole 312 are directed radially outwardly, as depicted in FIG. 3.

Moreover, in certain embodiments, the electric machine 302 may also be equipped with one or more rotor position sensors such as rotor position sensors 314, 316, and 318. The rotor position sensors 314-318 may be disposed proximate to the rotor poles 310 and 312 as depicted in FIG. 3. In the presently contemplated embodiment, the electric machine 302 is shown as having three rotor position sensors 314-318 for ease of illustration. Use of greater or fewer number of rotor position sensors is also envisioned, as is determining the rotor position through the voltages and currents applied to the phase input lines 301, 303, and 305. In a non-limiting example, the rotor position sensors 314-318 may be switches that may transition from ON-state to OFF-state, and vice-versa, based on the sides of rotor poles 310 and 312 that they are facing. In one embodiment, the rotor position sensors 314-318 transition to the ON-state when they face rotor poles having their N-sides directed radially outwardly. In other situations, the rotor position sensors 314-318 may transition to the OFF-state. For example, in the presently contemplated embodiment, the rotor position sensors 314-318 transition to the ON-state when they face the rotor pole 310 and transition to the OFF-state when they face the rotor pole 312.

Each rotor position sensor of the rotor position sensors 314-318 may generate an electric signal (see FIGS. 4A-4C) that is indicative of an angular position of the rotor 306. As previously noted, the rotor position sensors 314-318 may transition to the ON-state or OFF-state depending on sides of the rotor poles 310 and 312 that they are facing, which is indicative of the angular position of the rotor 306. In some embodiments, each of the rotor position sensors 314-318, in the ON-state, generates an electric signal having a first amplitude (in a non-limiting example, +5 Volts) and, in the OFF-state, generates the electric signal having a second amplitude (in a non-limiting example, +0 Volt). The first amplitude and the second amplitude are hereinafter referred to as "high level" (H) and "low level" (L), respectively.

Figure 4A:
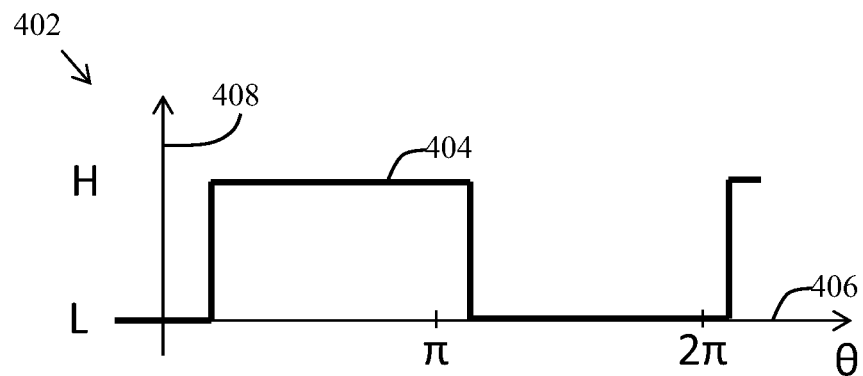
FIGS. 4A-4C depict graphical representations of example electric signals generated by the rotor position sensors, in accordance with aspects of the present specification.
Figure 4B:
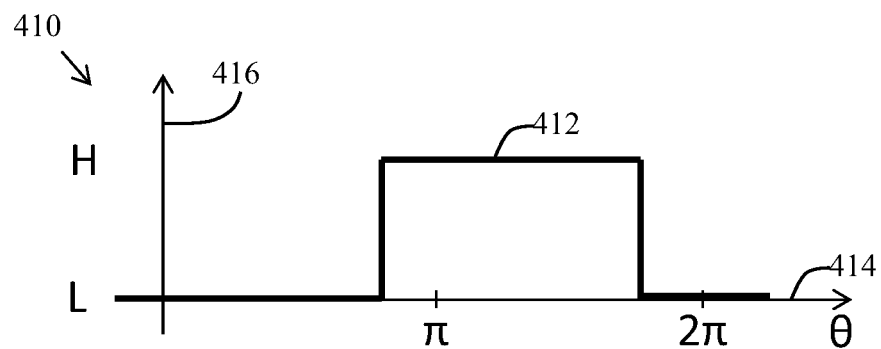
Figure 4C:
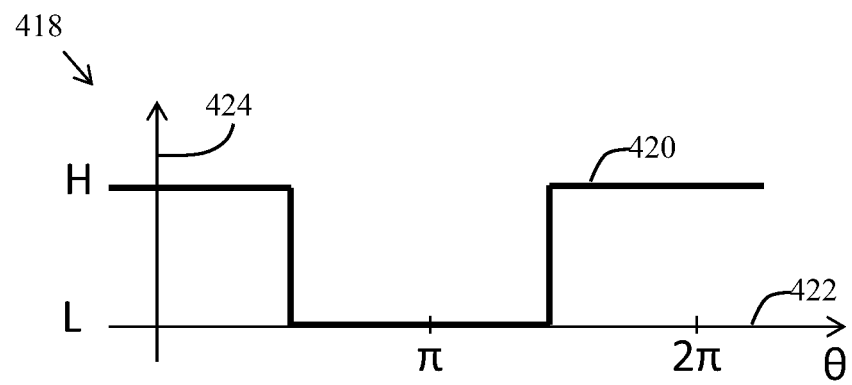

FIGS. 4A-4C depict graphical representations of example electric signals generated by the rotor position sensors 314-318, in accordance with aspects of the present specification. In particular, FIG. 4A depicts a graphical representation 402 of an example electric signal 404 generated by the rotor position sensor 314. The X-axis 406 of the graphical representation 402 represents a rotor position angle in radians and the Y-axis 408 of the graphical representation 402 represents a level of the electric signal 404. In a non-limiting example, the levels of the electric signal 404 are represented as "H" and "L." Similarly, FIG. 4B depicts a graphical representation 410 of an example electric signal 412 generated by the rotor position sensor 316. The X-axis 414 of the graphical representation 410 represents the rotor position angle in radians and the Y-axis 416 of the graphical representation 410 represents a level of the electric signal 412. In a non-limiting example, the levels of the electric signal 412 are represented as "H" and "L." Moreover, FIG. 4C depicts a graphical representation 418 of an example electric signal 420 generated by the rotor position sensor 318. The X-axis 422 of the graphical representation 418 represents the rotor position angle in radians and the Y-axis 424 of the graphical representation 418 represents a level of the electric signal 420. In a non-limiting example, the levels of the electric signal 420 are represented as "H" and "L."

Referring again to FIG. 3, in some embodiments, the fluid extraction sub-system 300 may also include a control sub-system 320 electrically coupled to the electric machine 302 and configured to control operation of the electric machine 302. Further, the control sub-system 320 may also be electrically coupled to the rotor position sensors 314-318. The control sub-system 320 may receive the electric signals 404, 412, and 420 from the rotor position sensors 314, 316, and 318, respectively.

Furthermore, the control sub-system 320 may also be electrically coupled to a DC-bus 322 having a DC conductor 324 carrying a positive DC and a DC conductor 325 carrying a negative DC. Additionally, the control sub-system 320 may also be configured to receive a speed control signal from a controller such as the controller 120 disposed outside the well 102. The control sub-system 320 may be configured to selectively control the supply of the positive DC and/or the negative DC as phase currents to the phase windings 308 of the electric machine 302 via the phase input lines 301, 303, and 305 based on the speed control signal. The control sub-system 320 may include a phase-shift control unit 326 and a switching unit 328. The phase-shift control unit 326 is communicatively coupled to the switching unit 328.

The phase-shift control unit 326 may include electronics (hardware and/or software) capable of performing operations including but not limited to signal decoding and/or delay insertion. In a non-limiting example, to aid in the above mentioned operations, the phase-shift control unit 326 may include logic gates, a microprocessor, memory, or combinations thereof. The microprocessor may include a reduced instruction set computing (RISC) architecture type microprocessor or a complex instruction set computing (CISC) architecture type microprocessor. Further, the microprocessor may be of a single-core type or multi-core type.

The phase-shift control unit 326 may be configured to generate a phase command signal. The phase command signal may indicate a polarity of the phase current to be supplied to one or more of the phase windings 308. The phase-shift control unit 326 may generate the phase command signal based on inputs to the phase-shift control unit 326. In some embodiments, the inputs to the phase-shift control unit 326 may include the electric signals 404, 412, and 420 and the speed control signal received from the controller 120 disposed outside the well 102.

In some embodiments, the speed control signal may be in the form of a code. The code may include a plurality of pairs of an identifier sub-code and a speed level sub-code, where each pair of the identifier sub-code and the speed level sub-code may correspond to one of the fluid extraction sub-systems 118 of the fluid extraction system 118. The identifier sub-code may be indicative of a fluid extraction sub-system of the fluid extraction sub-systems 118. The speed level sub-code associated with the identifier may be indicative of a desired operating speed at which an electric machine of the corresponding fluid extraction sub-system needs to be operated. Details of generation of the speed control signal are described later.

Accordingly, for a given fluid extraction sub-system, such as, the fluid extraction sub-system 300, the phase-shift control unit 326 may be configured to decode the speed control signal to determine a speed level sub-code intended for the fluid extraction sub-system 300. In a non-limiting example, the phase-shift control unit 326 may determine the speed level sub-code intended for the fluid extraction sub-system 300 by comparing a pre-defined identifier of the fluid extraction sub-system 300 with the identifiers contained in the speed control signal. Accordingly, a speed level sub-code associated with the identifier that matches with the pre-defined identifier of the fluid extraction sub-system 300 is selected.

Moreover, the phase-shift control unit 326 may also receive the electric signals 404, 412, and 420 generated by the rotor position sensors 314-318. In order to generate the phase command signal, the phase-shift control unit 326 may be configured to apply a phase shift to the received electric signals to generate phase shifted electric signals (see FIGS. 5A-5C) based on the speed control signal, and more particularly, based on the selected speed level sub-code.

Figure 5A:
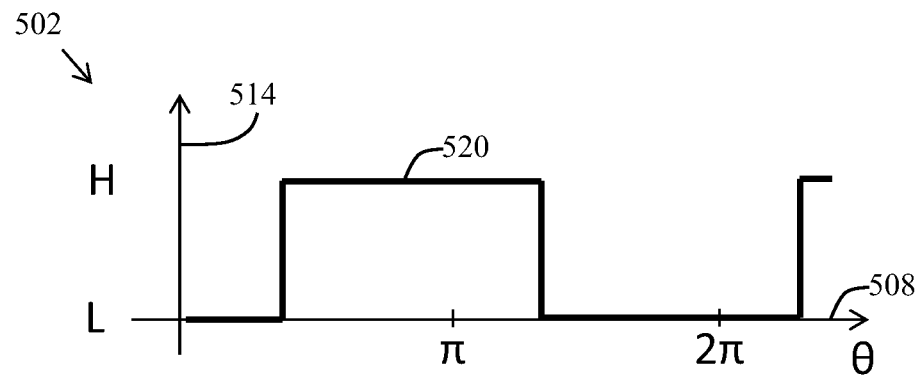
FIGS. 5A-5C depict graphical representations of example phase shifted electric signals, in accordance with aspects of the present specification.
Figure 5B:
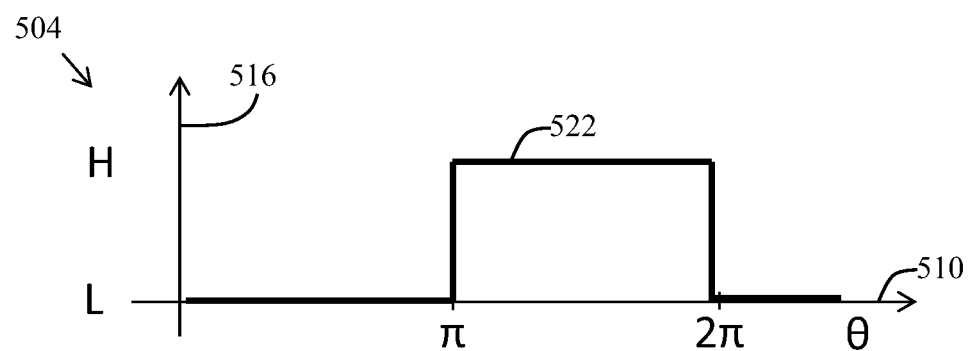
Figure 5C:
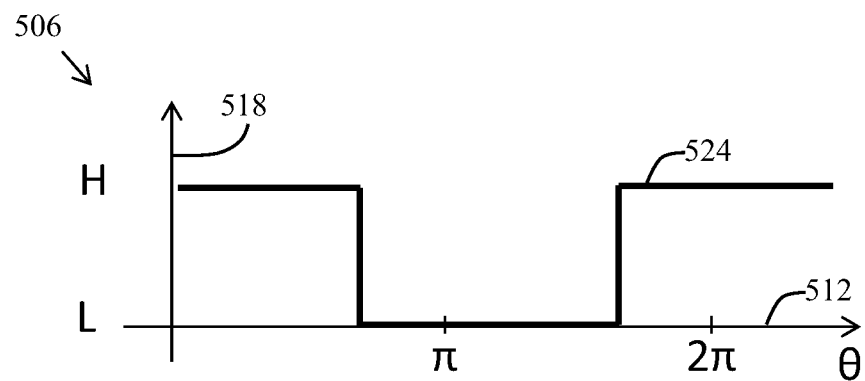

FIGS. 5A, 5B, and 5C respectively depict graphical representations 502, 504, and 506 of example phase shifted electric signals, in accordance with aspects of the present specification. The X-axis 508, 510, and 512 of the graphical representations 502, 504, and 506, respectively, represent a rotor position angle in radians. The Y-axis 514, 516, and 518 of the graphical representations 502, 504, and 506 represents a level of the phase-shifted electric signals 520, 522, and 524, respectively, the combinations of which determine when corresponding phase input lines conduct phase current. In a non-limiting example, the levels of the phase-shifted electric signals 520, 522, and 524 are represented as "H" and "L." The phase-shifted electric signals 520, 522, and 524 are representative of the electric signals 404, 412, and 420, respectively, when a phase-shift (for example, a delay) of a magnitude Ø is applied to the electric signals 404, 412, and 420, respectively. It will be appreciated that the phase-shift may also be negative, corresponding to phase advance rather than phase delay.

Referring again to FIG. 3, in some embodiments, the phase-shift control unit 326 may be configured to generate the phase-shifted electric signals 520, 522, and 524 by applying the phase shift of the magnitude Ø to the electric signal 404, 412, and 420, respectively, of FIGS. 4A-4C. In some embodiments, the speed level sub-codes contained in the speed control signal are indicative of the different magnitudes of the phase-shifts. Accordingly, the phase-shift control unit 326 may determine the magnitude Ø of the phase-shift based on the selected speed level sub-code from the speed control signal.

As previously noted, in a fluid extraction system such as the fluid extraction system 100, it may be desirable to operate the electric machines of the fluid extraction sub-systems 118 at different operating speeds. Accordingly, the control sub-systems of the respective fluid extraction sub-systems 118 may determine the magnitude of phase-shifts based on their respective pre-defined identifiers and the speed control signal in a similar fashion as mentioned above. Accordingly, different phase-shifts may be applied by different control sub-systems, thereby operating the electric machines of the fluid extraction sub-systems 118 at different operating speeds.

Further, in some embodiments, the phase-shift control unit 326 may be configured to generate the phase command signal based on the phase-shifted electric signals 520-524. As previously noted, the phase command signal may indicate the polarity of the phase current to be supplied to one or more of the phase windings 308 of the electric machine 302. Table-1 depicted below illustrates an example relationship between levels of the phase-shifted electric signals 520-524 and polarity of phase currents to be supplied to the electric machine 302.

TABLE 1

Example relationship between the phase-shifted electric signals 520, 522, and 524 and the polarity of phase current

| | Levels of | | | | | |
| --- | --- | --- | --- | --- | --- | --- |
| | Phase-shifted electric | Phase-shifted electric | Phase-shifted electric | Polarity of phase current | | Example phase |
| Row No. | signal 520 | signal 522 | signal 524 | Positive Phase line | Negative Phase line | command signals |
| 1 | L | H | L | 301 | 303 | (+1, −1, 0) |
| 2 | L | H | H | 301 | 305 | (+1, 0, −1) |
| 3 | L | L | H | 303 | 305 | (0, +1, −1) |
| 4 | H | L | H | 303 | 301 | (−1, +1, 0) |
| 5 | H | L | L | 305 | 301 | (−1, 0, +1) |
| 6 | H | H | L | 305 | 303 | (0, −1, +1) |

In a non-limiting example, the last column of the Table-1 represents example codes indicative of the phase command signals generated corresponding to the data in the respective row. By way of example, for a given phase command signal (+1, −1, 0), the symbols +1, −1, and 0, are respectively indicative of the polarity of the phase currents to be supplied on the phase input lines 301, 303, and 305. The symbol +1 may indicate a positive polarity, the symbol −1 may indicate a negative polarity, while the symbol 0 may indicate supply of no current.

Moreover, in some embodiments, the phase-shift control unit 326 may communicate the generated phase command signal to the switching unit 328. The switching unit 328 may be configured to supply the phase currents of desired polarities indicated by the phase command signal to the phase input lines 301, 303, and 305. In order to generate the phase currents, the switching unit 328 may include a switch assembly 330 and a gate drive unit 332 operatively coupled to the gate drive unit 332. More particularly, output terminals 334, 336, 338, 340, 342, and 344 of the gate drive unit 332 are coupled to the switch assembly 330. The output terminals 334, 336, 338, 340, 342, and 344 are hereinafter collectively referred to as the output terminals 334-344.

In some embodiments, the switch assembly 330 may include a plurality of semiconductor switches for selectively supplying the phase current to one or more of the phase windings 308 based on a plurality of received control signals (described later) received from the gate drive unit 332. In a non-limiting example, the switch assembly 330 may include six (6) semiconductor switches 335, 337, 339, 341, 343, 345, arranged as shown in FIG. 3. The semiconductor switches 335, 337, 339, 341, 343, and 345 are hereinafter collectively referred to as semiconductor switches 335-345. Non-limiting examples of the semiconductor switches 335-345 may include transistors, gate commutated thyristors, field effect transistors, insulated gate bipolar transistors, gate turn-off thyristors, static induction transistors, static induction thyristors, or combinations thereof. Moreover, materials used to form the semiconductor switches 335-345 may include, but are not limited to, silicon (Si), silicon carbide (SiC), gallium nitride (GaN), or combinations thereof.

In a non-limiting example of N-channel field effect transistors, each of the semiconductor switches 335-345 may include a drain terminal, a source terminal, and a control terminal (e.g., a gate terminal). As depicted in FIG. 3, the drain terminals of the semiconductor switches 335, 339, and 343 may be coupled to the DC conductor 324 carrying the positive DC and the source terminals of the semiconductor switches 337, 341, and 345 may be coupled to the DC conductor 325 carrying the positive DC. Further, the source terminals of the semiconductor switches 335, 339, and 343 may be respectively coupled to the drain terminals of the semiconductor switches 337, 341, and 345. Furthermore, the source terminals of the semiconductor switches 335, 339, and 343 and the drain terminals of the semiconductor switches 337, 341, and 345 may be coupled to the phase input lines 301, 303, and 305 of the electric machine 302. Additionally, the control terminals of the semiconductor switches 335-345 are coupled to the gate drive unit 332 to receive the respective ones of the plurality of control signals. More particularly, the control terminals of the semiconductor switches 335, 337, 339, 341, 343, and 345 are respectively coupled to the output terminals 334, 336, 338, 340, 342, 344 of the gate drive unit 332.

In the embodiment of FIG. 3, N-channel MOSFETs are used as the semiconductor switches 335-345. Accordingly, in one embodiment, application of a control signal of a high level (H) on their control terminals relative to respective source terminals may turn-on the semiconductor switches 335-345. Whereas, an application of a control signal of a low level (L) on their control terminals relative to the respective source terminals may turn-off the semiconductor switches 335-345. It may be noted that if P-channel MOSFETs are used as the semiconductor switches 335-345, the levels of the control signals may be interchanged.

The gate drive unit 332 is used to control switching of the semiconductor switches 335-345 by selectively supplying control signals to the control terminals of the semiconductor switches 335-345. The gate drive unit 332 may include electronics (hardware and/or software) capable of generating a plurality of control signals. In a non-limiting example, the gate drive unit 332 may include logic gates, transistors, a microcontroller, a microprocessor, memory, or combinations thereof.

The gate drive unit 332 may receive the phase command signal from the phase-shift control unit 326. Subsequent to the receipt of the phase command signal, the gate drive unit 332 may be configured to generate the plurality of control signals based on the phase command signal. In one embodiment, Table-2 depicted below, represents a plurality of control signal levels appearing at the output terminals 334-344, where the plurality of control signal levels correspond to various phase command signals. Moreover, the gate drive unit 332 may be configured to communicate the plurality of control signals to the control terminals of the semiconductor switches 335-345 via the output terminals 334-344, respectively.

TABLE 2

Example control signal levels appearing at the output terminals 334, 336, 338, 340, 342, 344 corresponding to different phase command signals

| Phase command signal | Levels of control signals at (334, 336, 338, 340, 342, 344) |
| --- | --- |
| (+1, −1, 0) | (H, L, L, H, L, L) |
| (+1, 0, −1) | (H, L, L, L, L, H) |
| (0, +1, −1) | (L, L, H, L, L, H) |
| (−1, +1, 0) | (L, H, H, L, L, L) |
| (−1, 0, +1) | (L, H, L, L, H, L) |
| (0, −1, +1) | (L, L, L, H, H, L) |

A first column of Table-2 represents example phase commands signals and the second column represents levels of control signals appearing at the output terminals 334, 336, 338, 340, 342, and 344, respectively, of the gate drive unit 332. For example, referring to the example illustrated in the first row of Table 2, a phase command (+1,−1,0) is indicative of supplying the positive DC to the phase input line 301, supplying the negative DC to the phase input line 303, and cutting-off supply of the phase current to the phase input line 305. As illustrated in Table-2, the corresponding levels of the control signals at the output terminals 334, 336, 338, 340, 342, and 344 are H, L, L, H, L, and L, respectively. Accordingly, the semiconductor switches 335 and 341 are turned-on while other semiconductor switches (337, 339, 343, and 345) are turned-off. Consequently, the positive DC is applied to the phase input line 301 and the negative DC is applied to the phase input line 303, while no current is applied to the phase input line 305. Similarly, examples illustrated in other rows of Table 2 may be interpreted likewise.

In some embodiments, the gate drive unit 332 may optionally include a pulse width modulation (PWM) sub-unit 333 (shown using dashed box). The PWM sub-unit 333 may be configured to apply PWM to one or more of the control signals at the output terminals 334, 336, 338, 340, 342, and 344 in order to achieve finer control of the operating speed of the electric machine 302.

In one embodiment, the pulse width of the control signals on one or more of the output terminals 334, 336, 338, 340, 342, and 344 may be controlled by the PWM sub-unit 333 based on amplitudes of the phase currents on two or more of the phase input lines 301, 303, and 305. The amplitudes of the phase currents on two or more of the phase input lines 301, 303, and 305 may be detected by one or more current sensors (not shown in FIG. 3) electrically coupled to the phase input lines 301, 303, and 305 or disposed in proximity of the phase input lines 301, 303, and 305. The one or more current sensors may be disposed within the electric machine 302 or outside the electric machine 302. Moreover, the one or more current sensors are electrically coupled to the PWM sub-unit 333 for communicating electrical signal indicative of the amplitudes of the phase current on two or more of the phase input lines 301, 303, and 305.

In another embodiment, amplitudes of the phase currents on two or more of the phase input lines 301, 303, and 305 may be detected by one or more current sensors (not shown in FIG. 3) electrically coupled to the DC conductors 324 and 325 or disposed in proximity of the DC conductors 324 and 325. The one or more current sensors are electrically coupled to the PWM sub-unit 333 for communicating electrical signal indicative of the amplitudes of the phase current on the DC conductors 324 and 325.

Figure 6:
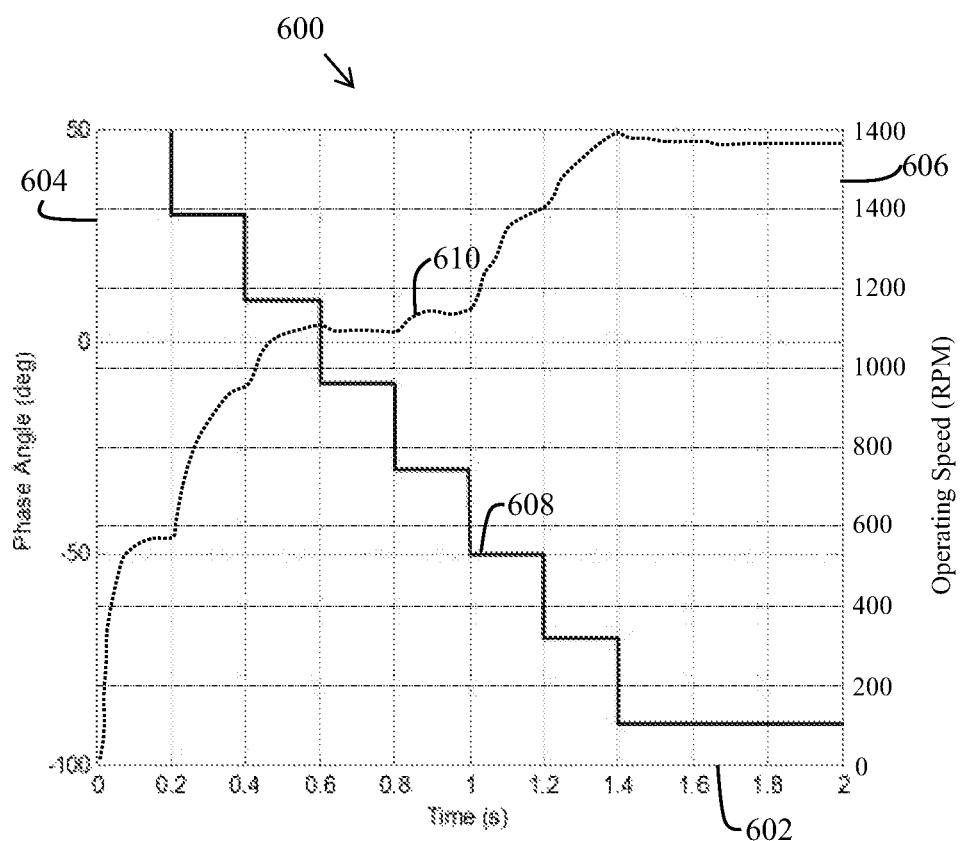
FIG. 6 is a graphical representation depicting an example relationship between a phase shift and an operating speed of an electric machine, in accordance with aspects of the present specification.

FIG. 6 is a graphical representation 600 depicting an example relationship between magnitude of a phase shift and an operating speed of an electric machine, in accordance with aspects of the present specification. In a non-limiting example, the graphical representation 600 depicts the relationship between the magnitude of the phase shift and the operating speed of the electric machine (for example, 122 or 302) at the maximum DC voltage of 800 volts (see FIG. 2). Accordingly, as illustrated a maximum operating speed of 1400 rpm is achievable when the DC voltage of 800 volts is provided on the DC-bus 116 (see FIG. 1).

The X-axis 602 of the graphical representation 600 represents time in seconds, for example. The first Y-axis 604 represents the phase-shift in degrees, ranging from −100 to +50, for example. Moreover, the second Y-axis 606 represents the operating speed of the electric machine 122, ranging from 0 to 1400 rpm, for example. A graph 608 is representative of values of the phase-shifts. Further, a graph 610 indicates values of the operating speed of the electric machine 122 corresponding to the values of the phase-shifts of graph 608. It may be observed from the graphical representation 600 that as the phase-shift increases, the operating speed of the electric machine 122 decreases. For example, at the DC voltage level of 800 volts on DC-bus 116, the maximum speed that may be achieved is 1400 rpm. However, if it is desired to operate the electric machine 122 at the speed of about 600 rpm, a phase-shift of about −32 degrees needs to be introduced in the electric signal generated by the rotor position sensors.

In some embodiments, a data representative of the graphical representation 600 may be stored in the memory associated with the controller 120 in the form of a look-up table or a mathematical relationship, for example. In certain embodiments, as previously noted, in order to operate the electric machines of the fluid extraction sub-systems 118 at different operating speeds, the controller 120 may generate and communicate the speed control signal to the fluid extraction sub-systems 118. In a non-limiting example, the controller 120 may generate the speed control signal based on the relationship depicted in the graphical representation 600.

By way of example, during operation of the fluid extraction system 100, for a given DC voltage magnitude (for example, 800 volts), if one electric machine (for example, the electric machine 122) of the fluid extraction sub-systems 118 in the vertical section 104 is desired to be operated at speed of 600 rpm, the controller 120 may determine that a phase-shift of −32 degrees needs to be introduced in the electric signal generated by the rotor position sensors. Similarly, depending on the desired operating speeds of electric machines in other fluid extraction sub-systems 118, the controller 120 may determine the magnitudes of required phase-shifts. Once the magnitudes of required phase-shifts are identified, the controller 120 may determine the speed level sub-codes corresponding to the determined magnitudes of required phase-shifts. In some embodiments, a mapping of the magnitudes of phase-shift and speed level sub-codes is stored in the memory associated with the controller 120. Accordingly, the controller 120 may generate speed level sub-codes corresponding to the magnitudes of required phase-shifts using the mapping of the magnitudes of phase-shift and speed level sub-codes stored in the memory. Once the speed level sub-codes are generated, the controller 120 may generate the speed control signal having the pairs of the identifier sub-code and the speed level sub-code for the fluid extraction sub-systems 118 of the fluid extraction system 100. The controller 120 may further be configured to communicate the generated speed control signal to the fluid extraction sub-systems 118.

Figure 7:
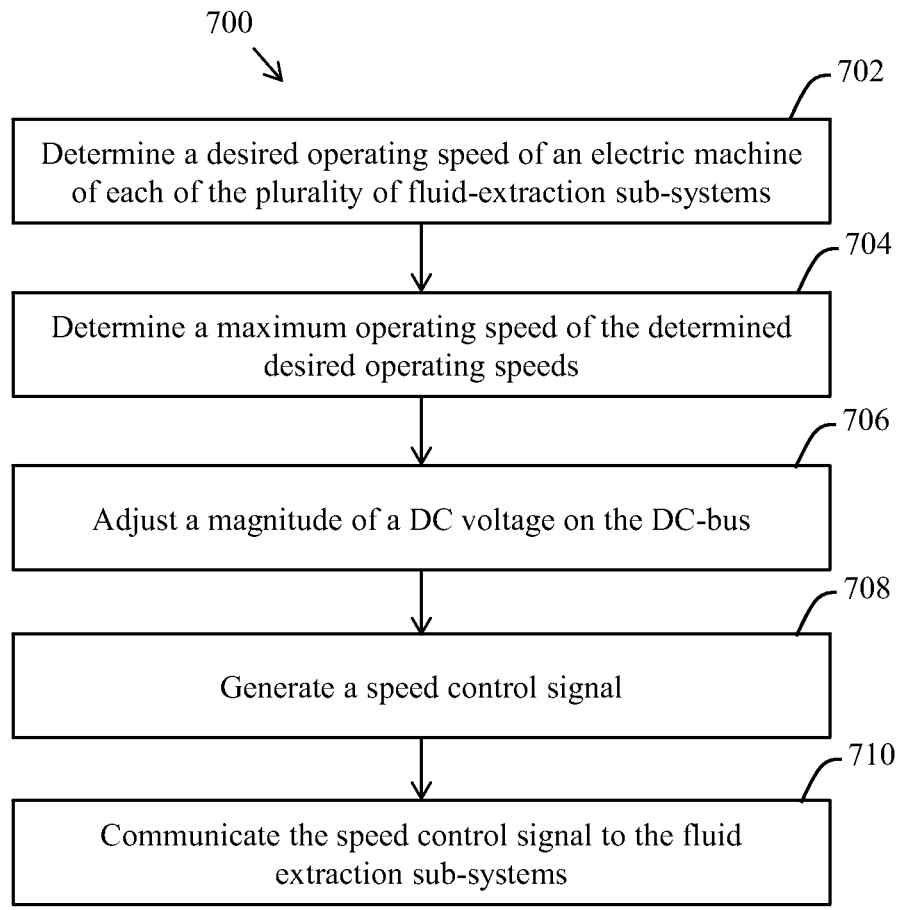
FIG. 7 is a flowchart of an example method of controlling operating speeds of electric machines in fluid-extraction sub-systems, in accordance with aspects of the present specification.

FIG. 7 is a flowchart 700 of an example method of controlling the operating speeds of electric machines in the fluid extraction sub-systems 118 of FIG. 1 coupled to the DC-bus 116, in accordance with aspects of the present specification. More particularly, the controller 120, by executing the method of flowchart 700, may be configured to control the operating speed of a given electric machine, such as the electric machine 122, independent of the operating speeds of electric machines of other fluid extraction sub-systems 118.

In some embodiments, it may be desirable to operate the electric machines of the fluid extraction sub-systems 118 at different operating speeds. Accordingly, at step 702, desired operating speeds of corresponding electric machines of one or more of the plurality of fluid extraction sub-systems 118 are determined. The controller 120 may determine the desired operating speeds of the electric machines of the one or more of the plurality of fluid extraction sub-systems 118 based on a type, desired flow and/or amount of the fluid to be extracted. Further, a maximum operating speed of the determined operating speeds may be determined by the controller 120, as indicated by step 704.

Furthermore, at step 706, a magnitude of the DC voltage on the DC-bus 116 may be adjusted by the controller 120. In some embodiments, the magnitude of the DC voltage on the DC-bus 116 may be adjusted based on the maximum operating speed such that at least one electric machine of the electric machines may be operable at the maximum operating speed. As previously noted, the controller 120 may determine the magnitude of the DC voltage to appear on the DC-bus 116 based on the relationship as depicted in the graphical representation 200 of FIG. 2.

Moreover, at step 708, a speed control signal may be generated by the controller 120 based on the desired operating speed of each electric machine and a desired magnitude of a phase-shift corresponding to the desired operating speed of each of the electric machine of each of the plurality of fluid extraction sub-systems 118. Details of generating the speed control signal are described in conjunction with FIG. 8. As previously noted, the speed control signal may be in the form of a code. The code may include a plurality of pairs of an identifier sub-code and a speed level sub-code, where each pair of the identifier sub-code and the speed level sub-code may correspond to one of the fluid extraction sub-systems 118 of the fluid extraction system 118. The identifier sub-code may be indicative of a fluid extraction sub-system of the fluid extraction sub-systems 118. The speed level sub-code may be indicative of a desired operating speed at which an electric machine of the corresponding fluid extraction sub-system needs to be operated.

Additionally, the speed control signal may be communicated to the fluid extraction sub-systems 118 by the controller 120, as indicated by step 710. More particularly, the speed control signal may be communicated so that the electric machines in the fluid extraction sub-systems 118 may be operated at the corresponding desired operating speeds. In some embodiments, in each fluid extraction sub-system 300, the speed control signal may be received by a respective phase-shift control unit, such as the phase-shift control unit 326. Detailed steps for controlling operation of an electric machine are described in conjunction with FIG. 9.

Figure 8:
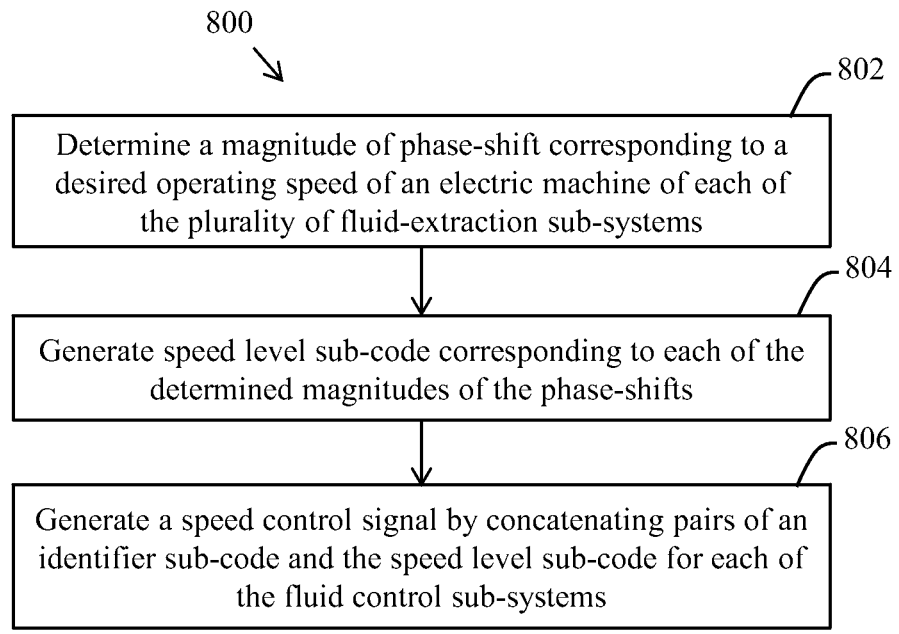
FIG. 8 is a flowchart of an example method of generating a speed control signal, in accordance with aspects of the present specification.

FIG. 8 is a flowchart 800 of an example method of generating speed control signal, in accordance with aspects of the present specification. As previously noted, at step 702 of flowchart 700, the controller 120 may have determined the desired operating speeds of the electric machines of the fluid extraction sub-systems 118. Also, magnitude of the DC voltage may be adjusted at a determined level at step 706 of the flowchart 700.

At step 802, a magnitude of phase-shift corresponding to the desired operating speed of the electric machine of each of the plurality of fluid extraction sub-systems 118 is determined by the controller 120. As previously noted, the controller 120 may determine the magnitudes of phase-shifts corresponding to the desired operating speeds using the relationship depicted in the graphical representation 600 of FIG. 6.

Moreover, a speed level sub-code corresponding to each of the determined magnitudes of the phase-shifts may be generated by the controller 120, as indicated by step 804. The controller 120 may generate speed level sub-codes corresponding to the magnitudes of required phase-shifts using a mapping of the magnitudes of phase-shift and speed level sub-codes, stored in the memory associated with the controller 120.

In some embodiments, the memory associated with the controller 120 also includes identifier sub-codes of the plurality of fluid extraction sub-systems 118. Accordingly, once the speed level sub-codes are generated, the speed control signal in the form of a code may be generated by the controller 120, as indicated by step 806. By way of example, the speed control signal may be generated by concatenating pairs of the identifier sub-code and the speed level sub-code for each of the fluid extraction sub-systems 118.

Figure 9:
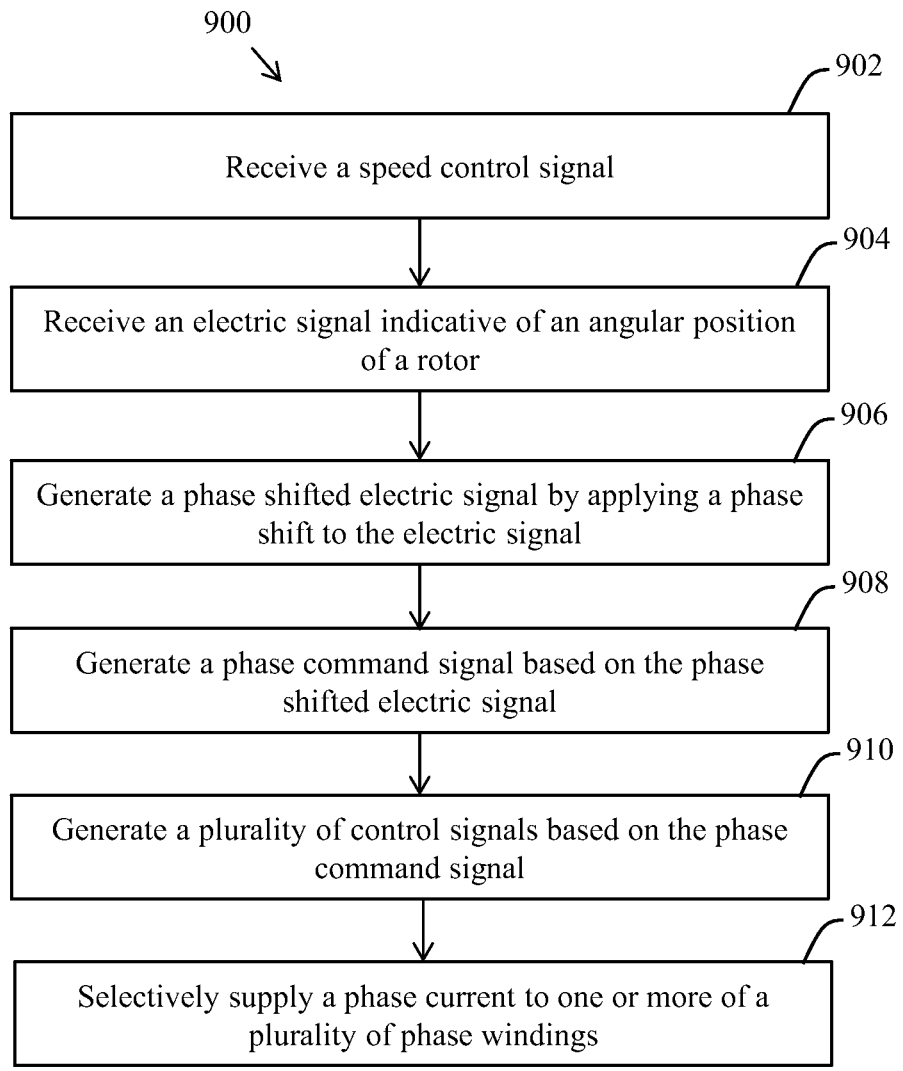
FIG. 9 is a flowchart of an example method of controlling an electric machine, in accordance with aspects of the present specification.

FIG. 9 is a flowchart 900 of an example method of controlling an electric machine such as the electric machine 302 (see FIG. 3), in accordance with aspects of the present specification.

At step 902, a speed control signal, such as, the speed control signal generated at step 706 (see FIG. 7), may be received by the control sub-system 320 of the fluid extraction sub-system 300. More particularly, the speed control signal may be received by the phase-shift control unit 326. Further, an electric signal indicative of an angular position of the rotor 306 may be received by the phase-shift control unit 326, as indicated by step 904. By way of example, the electric signals 404, 412, and 420 (see FIG. 4) generated by the rotor position sensors 314-318 may be received by the phase-shift control unit 326.

Furthermore, at step 906, a phase shifted electric signal may be generated by applying a phase shift to the electric signal. For example, the phase-shift control unit 326 may generate the phase-shifted signals 520-524 (see FIG. 5) by applying a phase-shift to the electric signals 404, 412, and 420. In one embodiment, a magnitude of the phase shift is determined based at least on the speed control signal indicative of the desired rotational speed (e.g., the operating speed) of the rotor 306. More particularly, the controller 120 may determine the magnitude of the phase shift based on the speed level sub-code (contained in the speed control signal) corresponding to the fluid extraction sub-system 300.

Additionally, a phase command signal may be generated by the phase-shift control unit 326 based on the phase-shifted electric signals 520-524, as indicated by step 908. In one embodiment, the phase command signal may be generated by the phase-shift control unit 326 based on the levels of the phase-shifted electric signals 520-524 using the relationship depicted in Table-1.

Moreover, at step 910, a plurality of control signals may be generated based on the phase command signal. The plurality of control signals is generated by the gate drive unit 332 using, for example, the relationships of Table-2. Depending on the plurality of the control signals, a phase current may be selectively supplied to one or more of the plurality of phase windings 308, as indicated by step 912. Further, based on the plurality of control signals, one or more of the semiconductor switches 334-344 may be selectively turned-on to supply the phase current with polarities indicated by the phase command signal.

Any of the foregoing steps and/or system elements may be suitably replaced, reordered, or removed, and additional steps and/or system elements may be inserted, depending on the needs of a particular application, and that the systems of the foregoing embodiments may be implemented using a wide variety of suitable processes and system elements and are not limited to any particular computer hardware, software, middleware, firmware, microcode, and the like.

Furthermore, the foregoing examples, demonstrations, and method steps such as those that may be performed by the controller 120 may be implemented by suitable code on a processor-based system, such as a general-purpose or special-purpose computer. Different implementations of the systems and methods may perform some or all of the steps described herein in different orders, parallel, or substantially concurrently. Furthermore, the functions may be implemented in a variety of programming languages, including but not limited to C++ or Java. Such code may be stored or adapted for storage on one or more tangible, computer readable media, such as on data repository chips, local or remote hard disks, optical disks (that is, CDs or DVDs), memory or other media, which may be accessed by a processor-based system to execute the stored code.

The systems and methods described herein aids in reducing overall cost of the fluid extraction system. The cost effectiveness is achieved at least in part due to the use of the supply of variable DC voltage to the fluid extraction sub-systems in the well. Further, the operating speeds of the electric machines are independently controllable. Such an independent control of the operating speeds is achieved at least in part by the use of the speed control signal and its decoding by the phase-shift control unit to control the supply of the phase currents to the electric machine. Moreover, use of the semiconductor switches that are formed using material that are capable of withstanding high temperatures, such as silicon carbide, aids in improving reliability.

It will be appreciated that variants of the above disclosed and other features and functions, or alternatives thereof, may be combined to create many other different systems or applications. Various unanticipated alternatives, modifications, variations, or improvements therein may be subsequently made by those skilled in the art and are also intended to be encompassed by the following embodiments.

The invention claimed is:

1. A control sub-system for controlling an electric machine, the control sub-system comprising:
    a phase shift control unit configured to:
        receive an electric signal indicative of an angular position of a rotor of the electric machine from at least one rotor position sensor of the electric machine;
        receive a speed control signal, wherein the speed control signal comprises a speed level sub-code indicative of a desired rotational speed of the rotor;
        decode the speed control signal to determine the speed level sub-code;

generate a phase shifted electric signal by applying a phase shift to the electric signal based at least on the speed level sub-code; and generate a phase command signal based on the phase shifted electric signal; and a switching unit electrically coupled to the phase shift control unit and configured to control a supply of a phase current to one or more phase windings of a plurality of phase windings of the electric machine based on the phase command signal such that the rotor is operated at the desired rotational speed.

2. The control sub-system of claim 1, wherein the phase shift control unit is configured to receive the speed control signal from a controller remote from the control sub-system.

3. The control sub-system of claim 1, wherein the phase command signal indicates a polarity of the phase current to be applied to the one or more of the plurality of phase windings.

4. The control sub-system of claim 1, wherein the switching unit comprises a gate drive unit electrically coupled to the phase shift control unit and configured to generate a plurality of control signals based on the phase command signal.

5. The control sub-system of claim 4, wherein the switching unit further comprises a switching assembly having a plurality of semiconductor switches for selectively supplying the phase current to one or more of the plurality of phase windings based on the plurality of control signals.

6. The control sub-system of claim 5, wherein each of the plurality of semiconductor switches comprises a control terminal, wherein the control terminal is coupled to the gate drive unit for receiving a corresponding control signal of the plurality of control signals.

7. The control sub-system of claim 5, wherein the plurality of semiconductor switches comprises transistors, gate commutated thyristors, field effect transistors, insulated gate bipolar transistors, gate turn-off thyristors, static induction transistors, static induction thyristors, or combinations thereof.

8. The control sub-system of claim 5, wherein the plurality of semiconductor switches is made of silicon (Si), silicon carbide (SiC), gallium nitride (GaN), or combinations thereof.

9. The control sub-system of claim 4, wherein the gate drive unit comprises a pulse width modulation (PWM) sub-unit configured to apply PWM to one or more of the plurality of control signals based on amplitude of the phase current.

10. The control sub-system of claim 1, wherein the switching unit is further electrically coupled to a direct current (DC) bus, and wherein the phase current is received from the DC-bus.

11. The control sub-system of claim 10, wherein a maximum rotational speed of the rotor in the electric machine depends on a DC voltage level of the DC-bus.

12. A method for controlling an electric machine, comprising:

receiving an electric signal indicative of an angular position of a rotor of the electric machine from at least one rotor position sensor;

receiving a speed control signal, wherein the speed control signal comprises a speed level sub-code indicative of a desired rotational speed of the rotor;

decoding the speed control signal to determine the speed level sub-code;

generating a phase shifted electric signal by applying a phase shift to the electric signal based at least on the speed level sub-code;

generating a phase command signal based on the phase shifted electric signal; and selectively supplying a phase current to one or more of a plurality of phase windings based on the phase command signal such that the rotor is operated at the desired rotational speed.

13. The method of claim 12, wherein the speed control signal is received from a controller disposed outside a well.

14. The method of claim 12, further comprising generating a plurality of control signals based on the phase command signal.

15. The method of claim 14, further comprising applying pulse width modulation to one or more of the plurality of control signals based on amplitude of the phase current.

16. The method of claim 14, wherein selectively supplying the phase current comprises selectively supplying the phase current to one or more of the plurality of phase windings based on the plurality of control signals.

* * * * *